July 18, 1950        C. H. HELM        2,515,873
PHOTOGRAPHIC CAMERA OBJECTIVES OF THE SCHMIDT TYPE
Filed Aug. 6, 1947
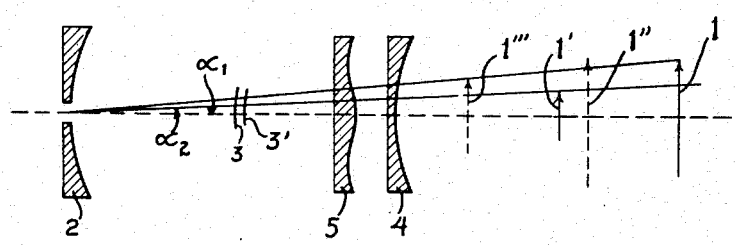
INVENTOR
Carl Henrik Helm
BY John Graham
ATTORNEY Patented July 18, 1950

2,515,873

UNITED STATES PATENT OFFICE 2,515,873

PHOTOGRAPHIC CAMERA OBJECTIVES OF THE SCHMIDT TYPE

Carl Henrik Helm, Charlottenlund, Denmark

Application August 6, 1947, Serial No. 766,828
In Denmark July 10, 1943

Section 1, Public Law 690, August 8, 1946
Patent expires July 10, 1963

3 Claims. (Cl. 88—57)

In connection with certain optical systems, for instance photographic objectives used with a collecting lens for photographing in natural colours, it is known to place a negative lens or lens system at a comparatively great distance in front of the objective in order to obtain a greater field and an improved definition towards the border of the picture.

Wide angle objectives have also been proposed in which the front lens is a negative one placed some distance from the other lenses.

It has now been found, however, that a corresponding arrangement can be advantageously used in combination with an optical image-forming system comprising a concave reflector with or without a correction element, for eliminating the spherical aberration, placed in front of the same. The resulting image-forming system according to the invention is characterized by the fact that a negative lens or lens system is placed in the rays falling upon the reflector at such a distance from the same that the image formed by the reflector of an object located in front of the negative lens or lens system is of a smaller size than if the negative component had not been present.

Under these circumstances the reflector will be capable of defining a greater field with no disadvantage other than that introduced by the aberrations of the negative lens or lens system itself, which aberrations may be very small. When an object is to be photographed from a definite distance it may be placed closer to the reflector than would have been the case if a negative lens or lens system had not been used and the effect thereof will be that exposure can be reduced, the decrease in distance to the object producing results similar to an increased relative aperture of the objective. It is an object of the present invention to make use of this circumstance in connection with the production of photographic reproductions of the image produced on a fluorescent screen by X-ray which is an important application of reflector cameras having a correction element, so called Schmidt-cameras.

According to an embodiment of the invention the negative lens or lens system in optical systems having a correction element with an aspherical surface according to Schmidt is placed adjacent to the plane of said correction element.

Another object of the present invention is to produce an optical system of the kind specified above in which the negative lens is produced by shaping the surface of the correction element facing the reflector as spherical concave surface.

Still another object of the present invention is to provide an optical system of the kind above specified in which the surface of revolution of the correction element is produced on the surface of a corrected negative lens system, for instance a Barlow-lens, facing the object.

One embodiment of the invention is diagrammatically shown on the drawing in which 1 is the object, 2 a concave reflector, 5 a correction element for eliminating spherical aberration and 3 the real image of the object formed by the reflector.

4 is a negative lens, 3 is the image that would be formed by the reflector if the negative lens 4 had not been present. Looking through the negative lens 4 towards the object 1 a diminished image 1' will appear a certain distance in front of the lens 4. The size and position of this image can be readily ascertained by known methods. When the reflector 2 and the negative lens 4 are both employed for the formation of the image a real image 3' is produced which image can be constructed by constructing the image of the virtual image 1' formed by the reflector 2 alone. When the distance between the reflector 2 and the negative lens 4 is between certain limits the image 3' will be smaller than the image 3 in spite of the fact that the image 1' is closer to the reflector than the object 1 itself. Moreover the distance between the reflector 2 and the image 3' will somewhat exceed the distance between the reflector and the image 3. The diameter of the negative lens 4 must be such that it does not to an undesirable degree cut off the rays from the object to the reflector 2.

The angle $a_1$, under which the virtual image 1' is seen from the reflector 2, is smaller than the angle $a_2$ under which the object would have been seen, had the negative lens 4 not been present. Consequently when the reflector 2 is fully utilized it will be able to define a greater field at the cost of no other depreciation of the quality of the image than that produced by the negative lens 4. This depreciation is often very small, especially if the focal length of the lens 4 is reasonably great. The depreciation can be made insignificant by using a negative lens system corrected in a suitable manner in place of a single negative lens.

The increase in field may be considerable, and the system taken as a whole will allow essentially the same amount of light to pass as the reflector itself irrespective of the relative aperture of the same. Instead of utilizing the lens 4 for forming a diminished image of the object 1 it is also possible (when the distance to the object is a definite one) to obtain the same size of image but greater relative aperture by altering the distance to the image.

Supposing that by removing the object 1 to the position 1" the virtual image 1'" then formed by the lens 4 will be seen from the reflector under the angle a₂, the system will work as if it had the shorter focal length corresponding thereto whereas at the same time the absolute aperture will be unchanged. Consequently the total system in this case works at a greater relative aperture.

Instead of using a separate correcting member 5 and a negative lens 4, the same may also be combined by forming a concave spherical limiting surface on the correcting member.

If a combined negative lens system is to be used in order to improve the quality of the image, the surface of revolution of the negative lens system facing the object may be shaped so as to comprise the curvature of the correcting member.

For this purpose the negative system is advantageously so constructed and calculated that the surface facing the object is plane or has only a slight curvature. For the negative component to be combined in this manner with the correction element, a Barlow lens may be used. The Barlow lens is characterized by the fact that the distortion of the image, inevitable when looking through a single negative lens, is eliminated for one direction of the light. Such lens systems may also be corrected for other aberrations.

If the system is of the kind corrected to suit a certain definite distance between the reflector and the object which may, for instance, be the case with the Schmidt-camera for X-ray screen photography it is obvious that this distance when a negative lens 4 or a negative lens system is used must be equal to the distance from the reflector to the virtual image 1' or 1'" and not to the real object 1 or 1".

If in for instance a Schmidt-camera for X-ray screen photographic purposes the ordinary correction member 5 is removed and another correction member which is concave on the surface facing the reflector is substituted therefor, it is possible by suitably choosing the radius of curvature of the concave surface to shorten the original distance to the 40 cms. by 40 cms. screen from 220 cms. to 180 cms., at the same time maintaining the same size of the image and the same curvature of the mirror. The correction plate must, however, be altered so as to eliminate the spherical aberration for the distance at which the virtual image 1'" is situated. At the same time the diameter of the reflector is preferably increased from the original diameter of 22.0 cms. to 23.6 cms. The relative aperture which was originally F: 0.8 is hereby altered to F: 0.68 corresponding to the ratio between the distances to the object without the quality of image being substantially depreciated. If it is desired to avoid any perceivable depreciation of the quality of the image, the curved correction surface according to Schmidt may be formed on the front surface of a suitable combined negative system.

It appears from the facts given above that the diameter of the reflector need not be increased in a proportion corresponding to the increase in relative aperture and the diameter of the correction member according to Schmidt may remain unchanged. If the diameters of the reflector and the correction member had had to be increased in accordance with the increase in the relative aperture, the exterior dimensions and the weight of the apparatus would have been very considerably increased whereas according to the present invention the said very small increase in the diameter of the reflector is sufficient to obtain the same increase in relative aperture. This small increase in the diameter of the reflector does not produce any alteration of the exterior dimensions of the apparatus. At the same time a considerable shortening of the distance to the screen is obtained which is generally a considerable advantage. In fact the difficulties and expenses of producing the reflector and the correction member to suit an increased relative aperture by directly increasing the diameter thereof would be so considerable that Schmidt-cameras of such relative aperture have not hitherto been produced.

Having thus set forth my invention, I claim:

1. Optical system consisting of a concave spherical reflector, a correction element for removing the spherical aberration thereof and having an aspherical surface according to Schmidt placed in front of the reflector in substantially the centre of the curvature thereof and a negative lens placed in such distance greater than that of the correction element from the mirror that the image formed by the mirror of an object seen through the negative lens will be a smaller one than that formed by the mirror of the same object when the negative lens is not present.

2. Optical system comprising a concave spherical reflector and a correction element for removing the spherical aberration thereof and having an aspherical revolution surface according to Schmidt placed in front of the reflector substantially in the distance of the curvature radius and a negative lens placed close to the correction element, and a fluorescent screen, the Schmidt surface being adapted to correct the spherical aberration of the reflector for rays coming from an image placed at the distance in which the negative lens forms virtual image of the screen.

3. An optical system comprising in combination a concave spherical reflector; a corrective element for removing spherical aberration having an aspherical surface according to Schmidt, said surface being placed in front of said reflector and substantially in the distance of the curvature radius of the reflector; and a negative lens spaced from the reflector such a distance greater than the distance of the corrective element from the reflector that an image of an object formed on said reflector and seen through said negative lens will be smaller than the image of the same object without said negative lens being present.

CARL HENRIK HELM.

REFERENCES CITED

The following references are of record in the file of this patent:

UNITED STATES PATENTS

| Number | Name | Date |
|---|---|---|
| 620,978 | Schupmann | Mar. 14, 1899 |
| 2,141,884 | Sonnefeld | Dec. 27, 1938 |
| 2,170,979 | Straubel | Aug. 29, 1939 |
| 2,336,379 | Warmisham | Dec. 7, 1943 |
| 2,350,112 | Houghton | May 30, 1944 |
| 2,420,349 | Bouwers | May 13, 1947 |

FOREIGN PATENTS

| Number | Country | Date |
|---|---|---|
| 544,694 | Great Britain | Apr. 23, 1942 |